(12) United States Patent
Kownacki

(10) Patent No.: US 12,093,869 B1
(45) Date of Patent: Sep. 17, 2024

(54) SYSTEMS AND METHODS FOR RISK MANAGEMENT UTILIZING THE SCIENTIFIC CHARACTERISTICS INHERENT IN CATASTROPHIC EVENTS

(71) Applicant: Michael Kownacki, Mahwah, NJ (US)

(72) Inventor: Michael Kownacki, Mahwah, NJ (US)

( * ) Notice: Subject to any disclaimer, the term of this patent is extended or adjusted under 35 U.S.C. 154(b) by 0 days.

(21) Appl. No.: 17/307,955

(22) Filed: May 4, 2021

Related U.S. Application Data

(63) Continuation-in-part of application No. 16/548,122, filed on Aug. 22, 2019, now abandoned, which is a continuation-in-part of application No. 15/866,433, filed on Jan. 9, 2018, now abandoned.

(60) Provisional application No. 62/443,940, filed on Jan. 9, 2017.

(51) Int. Cl.
| | |
|---|---|
| G06Q 10/0635 | (2023.01) |
| G06Q 20/40 | (2012.01) |
| G06Q 30/0201 | (2023.01) |
| G06Q 50/26 | (2012.01) |
| H04L 65/80 | (2022.01) |

(52) U.S. Cl.
CPC ....... *G06Q 10/0635* (2013.01); *G06Q 20/405* (2013.01); *G06Q 30/0206* (2013.01); *G06Q 50/265* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 5,704,045 A | * | 12/1997 | King | G06Q 40/08 705/38 |
| 8,280,633 B1 | * | 10/2012 | Eldering | G06Q 40/08 702/3 |
| 2004/0089711 A1 | * | 5/2004 | Sandru | G06Q 20/40 235/379 |
| 2004/0103003 A1 | * | 5/2004 | Mayers | G06Q 40/08 702/3 |
| 2008/0146240 A1 | * | 6/2008 | Trudeau | H04W 28/16 455/445 |
| 2017/0161859 A1 | * | 6/2017 | Baumgartner | G06Q 30/0202 |
| 2019/0370904 A1 | * | 12/2019 | Eichenblatt | G06Q 10/10 |
| 2021/0404823 A1 | * | 12/2021 | Kisser | G05D 1/0276 |
| 2023/0073745 A1 | * | 3/2023 | Rakshit | G06N 5/04 |

* cited by examiner

*Primary Examiner* — Kaveh Abrishamkar

(57) ABSTRACT

An information management system-implemented systems and methods for the continuous or near-continuous access to the real-time, near real-time or most recently available scientific characteristics inherent in existing catastrophic events, planet Earth's oceans, weather and environment, and the weather and the activity of our solar system, comprising methods for the continuous weighing, grading, prioritizing of the scientific characteristics, the calculation and quantification of such dynamic risks to humanity, assets, asset classes, infrastructure, and geographic locations, the application and implementation of artificial intelligence or machine learning to systems and methods, the presentation of such risks to a plethora of adapted computer terminals and devices, the exchange of such risk, and the system enterprise management architecture comprising the configurations and functions for the governance, implementation, and execution of systems and methods.

32 Claims, 9 Drawing Sheets

FIGURE 9

| Data / scientific characteristics of developing catastrophic events derived in real time, near real time, or most recently from various instruments and methods comprising satellites, seismic monitors, aircraft, drones, balloons, sea buoys, other scientific study, experiments and endeavors, and other sources. |

⬇

| Analyze / algorithmically quantify (comprising the weighing, and prioritization of scientific characteristics), scientific characteristics, such quantification, weighing and prioritizing of characteristics comprising an algorithmic method to determine and rate the catastrophic event's current and prospective intensity to determine the potential risk, such analysis comprising machine learning or artificial intelligence. |

⬇

| Analysis / algorithmically quantification comprising the implementation of historical data on catastrophic events to provide an alternative historical analysis, such analysis comprising the use of machine learning or artificial intelligence. |

⬇

| Analysis / algorithmically quantification comprising the interrelationships of the catastrophic event's current and prospective intensity to determine the prospective risk based upon the geospatial, scientific, structural, and physical characteristics associated with one or more assets, asset classes, infrastructure, and geographic locations, such analysis comprising the use of machine learning or artificial intelligence. |

SYSTEMS AND METHODS FOR RISK MANAGEMENT UTILIZING THE SCIENTIFIC CHARACTERISTICS INHERENT IN CATASTROPHIC EVENTS

BACKGROUND OF THE INVENTION

This invention relates to Systems and Methods for Risk Management Utilizing the Scientific Characteristics Inherent in Catastrophic Events, the Invention.

Once catastrophic events develop, they may take on many states very quickly. Catastrophic events result in extraordinary levels of devastation and loss and exhibit imminent, unpredictable, and uncontrollable characteristics.

Catastrophic events that exhibit such characteristics, that present a risk, comprises storm systems, tornadoes, tsunamis, wildfires, earthquakes, volcanic eruptions, and other disasters. Catastrophic events, such as storm systems, comprises tropical storms, tropical cyclones, hurricanes, typhoons, floods, blizzards, hailstorms, ice storms, dust storms, cyclonic storms, tropical depressions, post-tropical cyclones, cyclones, and windstorms.

It is estimated that globally, approximately 60,000 deaths occur annually due to catastrophic events. Extensive scientific research on climate change concludes earth's ocean and surface temperatures have increased to near catastrophic levels, threatening planet earth's humanity and ecosystems with heatwaves, melting glaciers and sea ice, rising sea levels, intensifying one of the most feared consequences of negative climate change, catastrophic events. Consequently, this will increase the frequency, duration, and devastation of unpredictable (with any degree of certainty) and unmanageable catastrophic events such as severe weather systems, storm surge, flooding, droughts, pandemics, wildfires, and other types of catastrophic events, resulting in the loss of human, flora, and fauna life.

Approximately two-thirds of the world's cities with a population of 5 million or more are in areas at risk to a rise in sea level, approximately 40% of the world's population and approximately 53% of the United States' population, all live near the coast. Catastrophic events have subjected 26 million people to poverty each year, and forcibly displaced 21.5 million people each year on average. It is estimated that the economic loss to the United States alone, due to climate related damage by the end of the century, if unmitigated, is expected to be more than 10 percent of its annual gross domestic product (GDP), and the United States' current-dollar GDP in 2020 was $21.48 trillion.

Sadly, in developing countries that are less fortunate, and to a lesser extent, those of wealth, many surviving victims are left abandoned after being stricken without enough notice and preparation, to painfully endure a life of poverty, famine and epidemic. It is predicted that between 2030 and 2050 climate change will cause approximately 250,000 additional fatalities each year from health-related issues.

Catastrophic events represent an unfathomable risk and the prediction technology available to accurately forecast catastrophic events is greatly compromised by the imminent, unpredictable, and uncontrollable characteristics inherent in catastrophic events.

Such imprecise predictability, along with sheer magnitude of devastation associated with catastrophic events in relationship to the human density of the at-risk regional area, and the associated economic loss within the threatened region that catastrophic events affect, prohibit the proper risk management of imminently threatened ecosystems and humanity. Resources for the preemptive protection of humanity, as well as the sustainable redevelopment of affected ecosystems are greatly compromised by the immense cost.

There exists a requirement for new, more efficient, and effective systems and methods, to manage the risk due to the imminent, unpredictable, and uncontrollable characteristics inherent in catastrophic events for the protection and sustainability of mankind.

SUMMARY OF THE INVENTION

Information management system-implemented systems and methods comprising one or more computers, one or more communications systems, one or more storage systems, a plurality of adapted computer terminals, and the enterprise management architecture, comprising the configurations and functions on a real-time, near real-time, or most recently available basis, derive, quantify, dynamically weigh and prioritize, calculate, quantify, and present the scientific characteristics, and conduct the exchange of the specific risk associated with catastrophic events, planet earth's oceans, weather and environment, and the weather and the activity of our solar system; such risk posed by the scientific characteristics inherent in existing catastrophic events, such risk to, assets, asset classes, and geographic locations, such risk comprising the geospatial, scientific, structural, and physical interrelationships of the characteristics inherent in existing catastrophic events and assets, asset classes, and geographic locations; access to the scientific characteristics inherent in existing catastrophic events, such systems and methods providing for the instantaneous or near instantaneous risk management of such risk.

This and other objects are accomplished in accordance with the principles of the Invention, Systems and Methods for Risk Management Utilizing the Scientific Characteristics Inherent in Catastrophic Events.

BRIEF DESCRIPTION OF DRAWINGS

Features of the Invention, Systems and Methods for Risk Management Utilizing the Scientific Characteristics Inherent in Catastrophic Events, will be more apparent from the following description taken in conjunction with the accompanying drawings, in which reference characters refer to parts throughout, or any similar combination of the same, satisfactory to execute and perform the methods required as described.

FIG. 9 is a block illustrative depiction of the methods of certain embodiments of the Invention.

DESCRIPTION OF THE INVENTION

Figure 1:
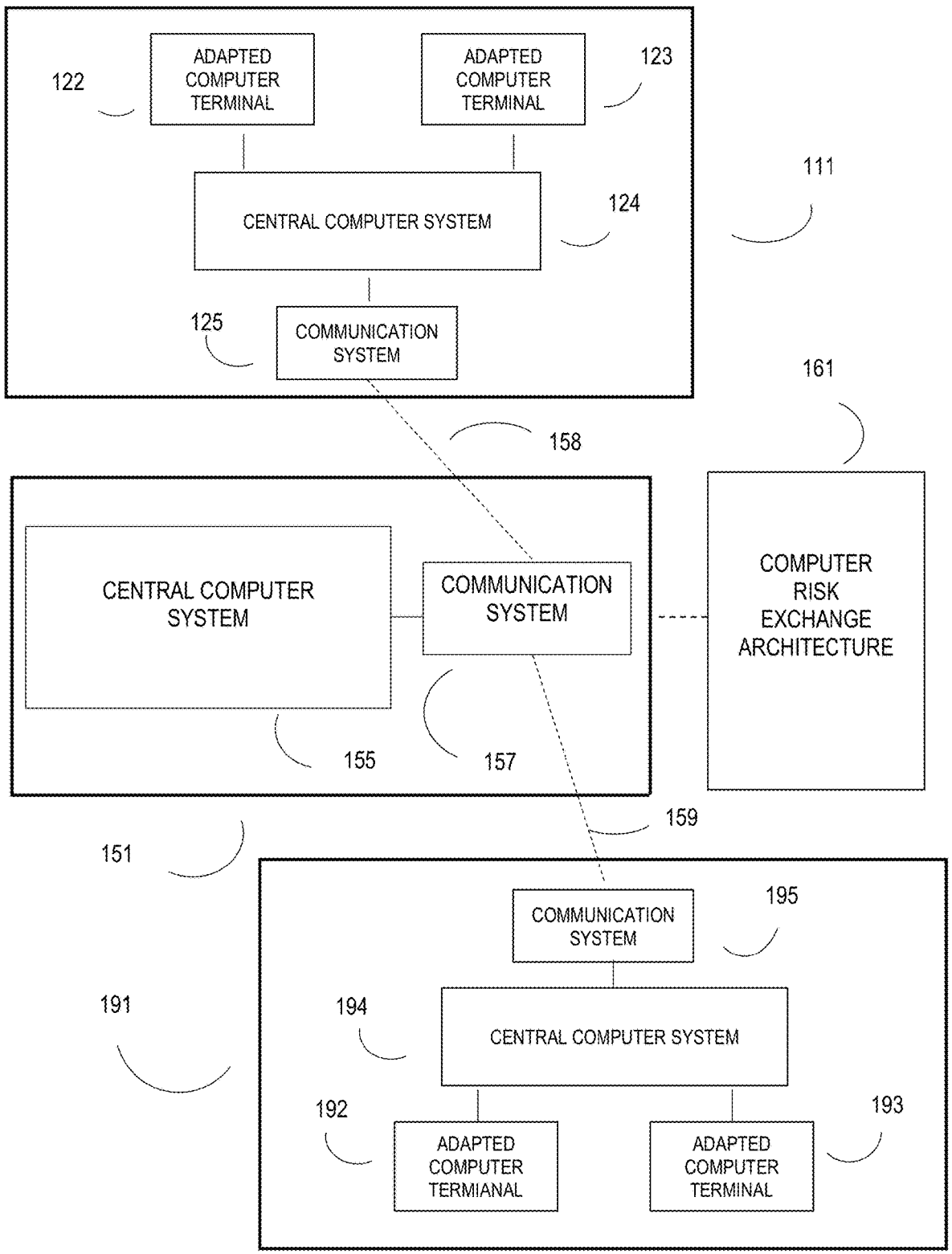
FIG. 1 is a block diagram of computer systems and its components that are used to implement the processes and functions of certain embodiments of the Invention.

Systems and Methods for Risk Management Utilizing the Scientific Characteristics Inherent in Catastrophic Events, comprises systems and methods to manage the imminent, unpredictable, uncontrollable, and dynamic characteristics related to existing catastrophic events, planet earth's oceans, weather and environment, and the weather and activity of our solar system. The systems and methods comprise an information management system-implemented method comprising one or more, processors, storage systems, communication systems, and a plurality of adapted computer terminals and devices to, on a real-time, near real-time, or most recently available basis, derive information, such information or data comprising the scientific characteristics related to existing catastrophic events, planet earth's oceans, weather and environment, and the weather and the activity of our solar system; to quantify the scientific characteristics inherent in existing catastrophic events, planet earth's oceans, weather and environment, and the weather and the activity of our solar system; to dynamically weigh and prioritize by order of importance the scientific characteristics related to existing catastrophic events, planet earth's oceans, weather and environment, and the weather and the activity of our solar system; to calculate and quantify the intensity of existing catastrophic events; to derive geospatial, scientific, structural, and physical characteristics of assets, asset classes, infrastructure, and geographic locations; to identify, calculate, and quantify the interrelationships of the scientific characteristics related to existing catastrophic events, planet earth's oceans, weather, and environment, and the weather and activity of our solar system to the geospatial, scientific, structural, and physical characteristics of assets, asset classes, and geographic locations; to identify, calculate, and quantify the risk posed by existing catastrophic events to humanity, assets, asset classes, infrastructure, and geographic locations; to present such information to a plurality of computer terminals and devices; to apply, implement, and utilize artificial intelligence or machine learning to the systems and methods comprised in Systems and Methods for Risk Management Utilizing the Scientific Characteristics Inherent in Catastrophic Events, the management of risk related to catastrophic events, and the utilization of derived data and historical data associated with catastrophic events, planet earth's oceans, weather and environment, and the weather and the activity of our solar system; an information management system-implemented system, comprising one or more processors, one or more communication systems, one or more storage systems, a plurality of adapted computer terminals or devices comprising the enterprise management architecture comprising the configurations and functions to implement, effect and manage the methods and systems in Systems and Methods for Risk Management Utilizing the Scientific Characteristics Inherent in Catastrophic Events, and the presentation, processing the exchange, clearing, and settlement of risk management orders, via one or more adapted computer terminals, such adapted computer terminals and devices providing users a bi-directional flow of data of the risk and exchange of risk associated with catastrophic events on a real-time, near real-time, or most recently available basis.

The imminent, unpredictable and uncontrollable characteristics inherent in existing catastrophic events, planet earth's oceans, weather and environment, and the weather and activity of our solar system, comprises those of which that occur in a very quick time, those of which that are unpredictable with a high degree of certainty, and those of which that are uncontrollable; such characteristics that necessitate the importance of the continuous or near-continuous access to real-time, near real-time or the most recently available information via one or more adapted computer terminal; the analysis of such information; the potential and possible severity for such risk in relationship to such information, and; the means to instantaneous or near-instantaneously manage a user's desired risk.

Existing catastrophic events comprise storm systems, including, tropical storms, tropical cyclones, hurricanes, typhoons, floods, blizzards, hailstorms, ice storms, dust storms, cyclonic storms, tropical depressions, post-tropical cyclones, cyclones, winds, storm surge; sea level rise; windstorms; hailstorms; tornadoes; tsunamis; wildfires; earthquakes; volcanic eruptions, coronal mass ejections, and other types of catastrophic events.

One of the most challenging characteristics of catastrophic events is that they are unpredictable with a high degree of certainty in relation to proximity, the specific timing, the intensity, and the degree of destruction to humanity, to the habitat, including assets, and infrastructure within a precise geographic area. Catastrophic events are generally large and dynamic. Many of the critical scientific characteristics inherent in these events continuously change significantly over time, affecting the predictive certainty as well as the intensity to the specific geographic area at risk, and the timing of the impact to a precise geographic area. This is critically important because having more precise information and utilizing it in the method identified would greatly improve our management of catastrophic events. The tracking of an important element to a catastrophic event, such as a storm system, by monitoring wind speed, rating the intensity utilizing solely it's wind speed, is imperfect, as the destruction from storm systems does not solely occur from wind speed alone. Other scientific characteristics related to storm systems such as the rise in sea level, sea surface temperature, wave height, the inherent moisture the storm system contains and the rainfall it creates, represent important characteristics that may cause flooding and destroy land, property, and life. Similar shortfalls exist in accurately predicting the degree of destruction for many other catastrophic events. All critical characteristics are considered for implementation. With respect to wildfires, the analysis of the type and condition of the surface fuel complex as well as the mass of canopy fuel, and the fuel continuity of the ecosystem of the fire is extremely important. Embodiments of these inventive methods and systems may then analyze and algorithmically quantify the risk by continuously grading and prioritizing the scientific characteristics to generate a risk profile and understand the risk. The risk profile may include, for example, a geospatial importance, a risk to geographic areas and the interrelationships of the risk to the geospatial, scientific, structural, and physical characteristics associated with one or more assets, asset classes, infrastructure, and geographic locations. The interrelationships of risk to the geospatial, scientific, structural, and physical characteristics associated with one or more assets, asset classes, infrastructure, and geographic locations is important in many ways. From a geospatial perspective, assets and infrastructure in low lying areas or those near the sea, lakes, or rivers may sustain more damage from a storm system that contains a significant amount of moisture or creates a rise of the sea or water level. Furthermore, the degree of such damage will vary greatly depending upon the scientific, structural, and physical characteristics of certain assets as a structure built of wood is more probable to sustain additional damage from high winds then a structure constructed of brick, stone, or concrete, or infrastructure constructed of steel. In volcanic eruptions, communities or assets or structures in low lying areas, near where lava may flow, are at a higher risk. The coronal mass ejections occurring on the sun's surface cause geomagnetic storms that result in disturbances on earth but, they effect planet earth or areas of earth differently because as they occur most are not directed to, nor severe enough to reach earth, so understanding and incorporating the scientific characteristics associated with the occurrence is important. Incorporating the interrelationship of the critical scientific characteristics of catastrophic events with the geospatial, scientific, structural, and physical perspective provides a more accurate diagnosis of the potential risk from such catastrophic events. Embodiments of this inventive method and system may employ artificial intelligence to develop the risk profile. As detailed herein, the measurement of many other scientific characteristics or important components to catastrophic events is critically important to life on earth. The invention incorporates a method, and system that comprises an enterprise management architecture to derive the scientific characteristics inherent in catastrophic events, on a real-time, near real-time, or most recently available basis. These scientific characteristics are derived from satellites, seismic monitors, aircraft, drones, balloons, sea buoys, and other methods that are configured to communicate on a real-time, near-real-time or most recently available basis. The invention comprises algorithmic processes that analyzes, quantifies, grades and prioritizes each scientific characteristic in relation to the then importance with each other, and any changes in such real-time, near real-time, or the most recently available scientific characteristics, as derived, and in relation to an implied risk. The analysis or algorithmic processes comprise the quantification, grading and prioritizing of the data or characteristics of catastrophic events. With the data quantified, continuously or near continuously graded and prioritized in this form, the invention then analyzes and produces structured data with a geospatial importance or with the potential risk imposed to geographic areas that comprises the potential risk interrelationships based upon the geospatial, scientific, structural, and physical characteristics associated with one or more assets, asset classes, infrastructure, and geographic locations. The system comprises the enterprise management architecture to perform the processes and methods, as well as the ability to then provide for the availability of such data and structured data to be in communication with a plurality of computer terminals and devices. Such enterprise management architecture comprises computer terminals and device recognition technology and provides for a bi-directional flow of data to present such potential risk and receive a variety of instructions and commands relating to such risk.

The imminent, unpredictable and uncontrollable characteristics inherent in existing catastrophic events, planet earth's oceans, weather and environment, and the weather and the activity of our solar system, comprises one or more: sea surface temperatures; sub-surface sea temperatures; the composition of sea water; atmospheric moisture; rates of rainfall; levels of moisture throughout the troposphere; the intensity change to the internal dynamical factors of storm systems; the dynamic instability of the eyewall potential vorticity annulus, it's breakdown and subsequent eddy flux of potential vorticity annulus from the eyewall into the eye; cloud layers; the height of clouds; the cloud top pressures; cloud top temperatures in proximity to storm systems; the depth of clouds; the particles in clouds; the size of particles in clouds; the moisture in clouds; the cloud patterns in proximity to storm systems; the moisture in atmospheric columns; the sea ice concentration in oceans; change in the sea ice covered area of oceans; the motion of water vapor in clouds; the motion of cloud features; lightning flashes; lightning events; the area of lightning groups; the degree of snow cover; the level of radiation in the atmosphere; the level of radiation exiting the atmosphere; hot spots; fires; the size of fires; the height of flames in fires; the intensity of fires; the type and condition of the fuel complex of fires; the heat released from surface fuels; the behavior of fires; fuel moisture content; the mass of canopy fuel; fuel continuity of the ecosystem of fires; the rate of which the fire is spreading; the degree of control of fires; the degree of containment of fires; the biomass of the ecosystem of fires; wind speeds; the height of volcanic ash; the mass of volcanic ash; radiances; ocean wave height; the degree of change in ocean wave height; algal blooms; the degree of cloudiness in the sky; sea level pressures; surface wind speeds; seismic activity; the movement of tectonic plates; the movement of magma; the change in the degree of the movement of magma; the dispensing of volcanic gas; the change in the degree of volcanic gas dispensed; the procession of earthquakes; the magnitude of earthquakes; the degree of change in the magnitude of earthquakes; tremors; surface changes on a volcano; the development of lava lakes on a volcano; surface changes in the immediate surrounding area of a volcano; the increase in the degree of rumbling of a volcano; magma raising from a volcano; the viscosity of magma rising from a volcano; the degree of silica in the magma rising from a volcano; the degree of pressurized gases released from the fumaroles of a volcano; the degree of the temperature of the gases released from a volcano; the radiation of compressional (P) waves and transverse (S) waves outward from the epicenter of an earthquake; the probability of exceeding levels of historical ground shaking; the probability, magnitudes and locations of earthquakes; ground motion detections from seismic stations; space weather; the eruption of gas and particles from the Sun's corona; solar wind; changes in solar wind; radiation emitted from the Sun into space; the degree of radiation emitted into space; the degree of the electrical charge of particles from the Sun's corona; solar wind blasts; the degree of solar wind blasts; auroras from charged particles emitted from the Sun; the degree of the auroras; solar flares from solar storms; solar eruptions or coronal mass ejections, and; the effect of the weather and activity of our solar system on the atmosphere, such information, critical to the ability to instantaneous or near-instantaneously manage such risk.

The risk associated with the catastrophic events comprises the scientific characteristic inherent in catastrophic events, planet earth's oceans, weather and environment, and the weather and the activity of our solar system, and their interrelationship to the geospatial, scientific, structural, and physical characteristics associated with specific assets, asset classes, infrastructure, and geographic locations. Such risk comprises any degree of risk to assets, asset classes, infrastructure, and geographic locations and such risk comprises continuous change.

The risk associated with the catastrophic events comprises the m-nat-e-scientific characteristic inherent in catastrophic events, planet earth's oceans, weather and environment, and the weather and the activity of our solar system, and their interrelationships to the geospatial, scientific, structural, and physical characteristics associated with the specific assets, asset classes, and geographic locations, comprises any degree of the related risk to specific assets, asset classes, and geographic locations, including the risk identified via a contract, the value and price of such risk may be derived in any acceptable currency.

The risk associated with the catastrophic events comprises the scientific characteristic inherent in catastrophic events, planet earth's oceans, weather and environment, and the weather and the activity of our solar system, and their interrelationship to the geospatial, scientific, structural, and physical characteristics associated with assets, asset classes, and geographic locations, comprises an algorithmically derived calculations, and; the utilization and application of artificial intelligence, including machine learning, including the utilization of historical data associated with characteristics inherent in existing catastrophic events, planet earth's oceans, weather and environment, and the weather and the activity of our solar system.

The information management system-implemented systems and methods comprising a plurality of adapted computer terminals connected through data communication linked networks to the information management system or computer processor, under the management of the enterprise management architecture, comprises a bi-directional flow of data to the processor. Such adapted computer terminal present the real-time or near real-time access to the scientific characteristics inherent in existing catastrophic events, planet earth's oceans, weather and environment, and the weather and the activity of our solar system; structured data, including structured data derived through artificial intelligence or machine learning, and the use of historical data, including historical data relating to the scientific characteristics inherent in catastrophic events, planet earth's oceans, weather and environment, and the weather and the activity of our solar system; the risk related to assets, asset classes, and geographic locations, the interrelationships of the characteristics inherent in existing catastrophic events, planet earth's oceans, weather and environment, and the weather and the activity of our solar system, and; the geospatial, scientific, structural, and physical characteristics associated with assets, asset classes, and geographic locations, including their interrelationships with characteristics inherent in existing catastrophic events, planet earth's oceans, weather and environment, and the weather and the activity of our solar system; in the exchange of such risk, data on the condition of the market, including the current value of such risk, the current price of contracts of certain risk; the exchange of risk, including the executed risk management transaction values, pricing levels, and maturities; risk management transaction pricing, and maturity indications of interest; access to quantitative software designed for the analysis of existing, prospective, and alternative risk positions; various interfaces comprising the ability to incorporate, link, and utilize the user's proprietary software for the analysis of existing, prospective, and alternative risk positions in relation to the risk management of the aforementioned scientific characteristics and such interrelationships; maps; simulations, and; video; all such technological capabilities providing the users the ability to manage such risk in an instantaneous, near instantaneous, or timely manner.

The real-time, near real-time, or most recently available data associated with the characteristics inherent in existing catastrophic events, planet earth's oceans, weather and environment, and the weather and the activity of our solar system, and their interrelationship to the geospatial, scientific, structural, and physical characteristics associated with the composition of specific assets, asset classes, and geographic locations, consists of deriving, directly or indirectly by the information management system-implemented method and apparatus from sources, comprising universe-based satellites, and earth terrestrial-based monitoring devices, having geospatial associations; the system and method comprising a one or more networked observation satellites in geostationary earth orbit, low earth orbit, medium earth orbit, polar earth orbit, geosynchronous earth orbit, sun-synchronous earth orbit, high elliptical earth orbit, lunar earth orbit, and transfer earth orbit altitudes; such data accessible by communication systems networked to communicate with at least one external device and earth terrestrial ground station communications links maintaining connections with the satellites transmitting data at X-band, Ku-band, V-band, W-band, Q-band, C-band, L-band, S-band radio frequencies, or any other band or authorized frequency, or via optical laser communication, and satellite to satellite links; a plurality of networked earth terrestrial based seismic monitors, aircraft, drones, balloons, and sea buoys, comprising a communication systems networked to communicate with at least one external device; at least one external device may consist of at least one earth terrestrial-based ground station interconnected through an earth terrestrial-based communication network, wherein an earth terrestrial-based communication network is continuously sinking real-time, near-real-time or most recently available data to the information management system consisting of one or more data processing systems, one or more storage system, one or more communication network, a plurality of adapted computer terminals, and; furthermore, the information management system accepts user input requests and direction to execute and process instructions, or via the computer risk exchange architecture, risk management orders via a plurality of adapted computer terminals.

The information management system-implemented systems and methods consisting one or more data processing systems, one or more storage systems, one or more communication networks, and via a plurality of adapted computer terminals, comprises the enterprise management architecture comprising the functionality to conduct the exchange of the specific risk associated with catastrophic events, that is expressed as a value of the related risk, expressed as any degree of value of the related risk, expressed based on the related risk the value of a contract between a buyer and a seller, the price of such contract, denominated in any acceptable currency; such exchange of the specific risk associated with catastrophic events governed in an sequential, orderly manner to successfully match and execute such risk management orders, validate such risk management orders, record such risk management orders, collect and maintain margins in accordance with the credit quality of the users, approvals, and the dynamic and changing risk inherent in catastrophic events; match open short risk positions with open long risk positions for delivery; the processing of notices of delivery, and; the generation of delivery statistics to users, whether such risk management orders are received directly from users or by way of a floor-brokerage operations or algorithmic trading methods.

The risk associated with the characteristics inherent in existing catastrophic events, planet earth's oceans, weather and environment, and the weather and the activity of our solar system, and their interrelationship to the geospatial, scientific, structural, and physical characteristics associated with specific assets, asset classes, infrastructure, and geographic locations, comprises risk related to a pre-determined value, predicated on a specific, pre-defined occurrence corresponding to a specific existing catastrophic event, such pre-defined occurrence, defined by a set of specific parameters or one or more specified occurrences; the contract for such the risk comprising a face value, one or more pre-defined occurrence, defined by a set of specific parameters or one or more specified occurrences, one or more specifically identified assets, within a specifically identified asset class, infrastructure, and within a specifically identified geographic location.

The face value, comprises the greatest risk one may incur should it be determined that an actual loss has occurred. Such actual loss, should it be determined that an actual loss occurred, comprises a loss associated with or damage to specific assets, asset classes, infrastructure, and a geographic location or that which is predicated on a specific, pre-defined occurrence corresponding to a specific existing catastrophic event, such pre-defined occurrence, defined by a set of specific parameters or one or more specified occurrences, such actual loss that is a direct result of the catastrophic event. Such actual loss shall be determined within a specified time period, and once determined, a settlement shall be determined to occur within a specified time period.

The characteristics inherent in existing catastrophic events, planet earth's oceans, weather and environment, and the weather and activity of our solar system, comprises a highly volatile and dynamic state with respect to the risk, thereby necessitating, the most pertinent and crucial real-time, near real-time or most recently available and meaningful information, that is continuously or near-continuously accessible and presentable, in a time sensitive environment, for one to instantaneously or near instantaneously analyze, monitor, value, and manage the desired risk, such a necessity, an essential requirement for the information management system-implemented systems and methods.

The information management system-implemented systems and methods, by way of a communication system, comprising the utilization of wired and wireless communications technology, managed by the enterprise management architecture, comprises functions to provide for the continuous or near-continuous access to the information that is pertinent and crucial to the scientific characteristics of existing catastrophic events, planet earth's oceans, weather and environment, and the weather and activity of our solar system, such information, including data, that is input and output to and from the information management system, on a real-time, near real-time or most recently available basis.

The information management system-implemented systems and methods, managed by the enterprise management architecture, comprises a process function to provide for the continuous or near-continuous and instantaneous or near-instantaneous evaluation, monitoring, analysis, valuation and management of the desired risk, such management of the desired risk, the critical means to alter one's risk, to increase or incur exposure to the risk and/or to eliminate or decrease exposure to such risk, in whole or in part, due to the continuously or near-continuously changing information.

The information management system-implemented systems and methods managed by the enterprise management architecture, prepares, processes, and interprets functions, performs real-time processing of the continuously or near continuously detected, acquired or input information, such information, including data, that is pertinent and crucial to the characteristics of existing catastrophic events, planet earth's oceans, weather and environment, and the weather and activity of our solar system, an information processing cycle, that provides access to the information in the form in which the information is input or acquired, as well as access to structured data or information in reformatted and reclassified forms, comprising algorithmic processes, intelligent agents, artificial intelligence or machine learning, comparisons, diagrams, charts, images, reports, graphics, and media, to present such real-time, near real-time and most recently available information to provide one the means to continuously manage the desired risk in a time sensitive environment.

The management of such desired risk, the means to alter such risk, to incur or increase exposure to such risk or to eliminate or decrease exposure to such risk, comprises granting one user the right, but not the obligation, to alter the risk, to incur or increase the risk or to eliminate or decrease the risk, such risk due to existing catastrophic events, such granting one user the right, by another user.

The imminent, unpredictable and uncontrollable characteristics of existing catastrophic events, planet Earth's oceans, weather and environment, and the weather and activity of our solar system, inherent with its volatility, presents uncertainty and may create many different views to users with exposure to the risk, and in a time sensitive environment, the information management system-implemented method and apparatus, together with such information, comprises the means for users to instantaneously or near-instantaneously manage such exposure to such risk, by eliminating the risk or reducing the severity of any risk, and; conversely, based upon a different view, in a time sensitive environment, provides users the means to manage such desired exposure by incurring such risk or increasing exposure to such risk.

The risk, further comprises exposure to either one or more defined assets, within a defined asset class, such asset classes defined as, residential real estate, commercial real estate, personal property, municipal, county, state or federal government infrastructure, or the like; an identification code associated with such existing catastrophic event, a specific known name for such existing catastrophic event; a precisely defined and delineated geographic location, the legal limits of a state, county, parish, city, municipality or township, zip code or address; one or more precisely defined assets, the precisely defined property; specifically identified infrastructure; an effective date, an expiration date; a settlement date, and; such risk can specifically exclude one or more specifically defined assets, asset classes, and/or a specific geographic location, as detailed by one or more specific addresses or detailed descriptions.

The risk may be equal to the actual loss incurred, up to, but not in excess of the face value of the contract or instrument that has been incurred, should it be determined an actual loss occurred, a settlement payment, such settlement payment, a payment by, one user, who desired to incur the risk, should it be determined that a actual loss occurred, in the amount of the actual loss, up to, but not in excess of the face value of the contract or instrument, shall be due and payable, in full or in part, on one or more specific settlement dates, any such settlement payments to be processed by the enterprise management architecture, a clearing operation and/or such settlement services, calculating offsetting positions and in consideration of any required collateral that may have been posted, to ensure the risk performance obligation, and taking into account off-setting positions, if any.

The information management system-implemented systems and methods, managed by the enterprise management architecture, comprises the critical means to analyze, value, monitor and manage a user's exposure to such risk, on an instantaneous or near-instantaneous basis, in reliance upon the presentation of the most pertinent and crucial real-time, near real-time or most recently available information and one or more identified existing catastrophic events.

Systems and Methods for Risk Management Utilizing the Scientific Characteristics Inherent in Catastrophic Events comprises systems and methods to manage the imminent, unpredictable, uncontrollable, and dynamic characteristics related to existing catastrophic events, planet earth's oceans, weather and environment, and the weather and activity of our solar system in real-time, near real-time, or on a most recently available basis; then, derives the data that comprises the characteristics related to existing catastrophic events, planet earth's oceans, weather and environment, and the weather and the activity of our solar system; quantifies the characteristics inherent in existing catastrophic events, planet earth's oceans, weather and environment, and the weather and the activity of our solar system; weighs and prioritizes by order of importance the characteristics related to existing catastrophic events, planet earth's oceans, weather and environment, and the weather and the activity of our solar system; calculates and quantifies the intensity of existing catastrophic events; derives geospatial, scientific, structural, and physical characteristics of assets, asset classes, infrastructure, and geographic locations, to identify, calculate, and quantify the interrelationships of the scientific characteristics related to existing catastrophic events, planet earth's oceans, weather, and environment, and the weather and activity of our solar system to the geospatial, scientific, structural, and physical characteristics of assets, asset classes, and geographic locations; identifies, calculates, and quantifies the risk posed by existing catastrophic events to humanity, assets, asset classes, infrastructure, and geographic locations; presents such information to a plurality of computer terminals and devices; applies, implements, and utilizes artificial intelligence or machine learning to the methods comprised in Systems and Methods for Risk Management Utilizing the Scientific Characteristics Inherent in Catastrophic Events, the management of risk related to catastrophic events, and the utilization of derived data and historical data associated with catastrophic events, planet earth's oceans, weather and environment, and the weather and the activity of our solar system; systems comprise an information management system-implemented system, comprising one or more processors, one or more communication systems, one or more storage systems, a plurality of adapted computer terminals, comprising the enterprise management architecture comprising the configurations and functions to implement, effect and manage the methods and systems in Systems and Methods for Risk Management Utilizing the Scientific Characteristics Inherent in Catastrophic Events, and the determination, presentation, processing of the characteristics, the risk to humanity, assets, asset classes, infrastructure, and geographic locations, the exchange of such risk to humanity, assets, asset classes, infrastructure and geographic locations, the execution, clearing, and settlement of risk management orders, via one or more adapted computer terminals or devices, such adapted computer terminals or devices providing users a bi-directional flow of data of the risk and the exchange of risk associated with catastrophic events on a real-time, near real-time, or most recently available basis. One of ordinary skill in the art should appreciate that the systems and methods of the Invention, to provide Systems and Methods for Risk Management Utilizing the Scientific Characteristics Inherent in Catastrophic Events, may be practiced in embodiments other than those illustrated herein without departing from the spirit and scope of the Invention.

DETAILED DESCRIPTION OF THE DRAWINGS

Further details of the Invention, Systems and Methods for Risk Management Utilizing the Scientific Characteristics Inherent in Catastrophic Events, are described below with respect to FIG. 1 through FIG. 9.

Referring to FIG. 1, a block diagram of systems 151, 111, 191 and including computer risk exchange architecture 161, is an illustration showing how the invention, Systems and Methods for Risk Management Utilizing the Scientific Characteristics Inherent in Catastrophic Events, may be implemented.

Information management system 151 provides approved users, such as one user incurring exposure to risk via information management system 111, and another user eliminating exposure to risk via information management system 191, with the ability to share certain resources, via including the information pertinent to and necessary to evaluate, value, analyze, monitor, and manage the risk. Additionally, certain resources are shared with computer risk exchange architecture 161 to clear such desired risk exposure and settle an actual loss, if any.

Information management system 151, communication system 157, which may include a modem or other similar devices that may be deemed acceptable, and computer risk exchange architecture 161, among other devices, may be networked together by way of a local area network, a wide area network, intranet, the internet or other wired and/or wireless interconnects and/or network adapters that may be deemed acceptable, to share certain resources, such as processors, memory, data, software, communication protocol, information, including information pertinent to, and necessary to market, evaluate, analyze, monitor, value, and manage the incurrence and elimination of such risk, and the clearing of transactions by way of communication system 157 to communicate with computer risk exchange architecture 161 by way of communication media link 156, which may be cables, telephone lines, cellular radio, intranet, the internet, satellites, other wired and/or wireless interconnects and/or network adapters and/or modes of communication deemed suitable. Information management system 151 may be comprised of computer processors, data storage systems, communication systems, adapted computer terminals, or other devices deemed suitable for such function.

Communication system 157 is linked to communication systems 125 and communication system 195 by way of communication media links 158 and communication media link 159, communication system 157, sharing certain resources, such as processors, memory, data, software, communication protocol, and information, including information pertinent to, and necessary to market, evaluate, analyze, monitor, value, manage and execute the incurrence and elimination of such risk, as well as clear transaction by the way of computer risk exchange architecture 161.

The user desiring to eliminate or decrease exposure to such risk, such user's adapted computer terminals 122 and 123, and the user desiring to incur or increase exposure to such risk, such user's adapted computer terminals 192 and 193, may comprise computer processors, data storage systems, communication systems, adapted computer terminals or other devices deemed suitable for such function, with the ability to share certain resources, including information pertinent to, and necessary to market, evaluate, analyze, value, monitor, manage and execute the incurrence and elimination of such risk, and the clearing and settlement of risk exposure with computer risk exchange architecture 161.

Communication system 125, communication system 157 and communication system 195 communicate by way of communication media link 158, and communication media link 159, which may be cables, telephone lines, cellular radio, intranet, the internet, satellites or other wired and wireless interconnects and network adapters and/or modes of communication that may be deemed acceptable.

One user desiring to incur such risk via one user's information management system 111 may consist of central computer system 124 that may be comprised of central processing units, mainframes, super computers, memory, data storage devices, system software, communication protocol, application software, devices, related electronics and other computer hardware and software that may be deemed acceptable and may be networked with communication system 125 and adapted computer terminals 122 and 123 by way of a local area network, a wide area network, intranet, the internet and/or other wired or wireless interconnects and network adapters and other modes that may be deemed acceptable, allowing users, such as user's adapted computer terminals 192 and 193, to share certain information pertinent to, and necessary, to market, evaluate, analyze, monitor, value, manage and execute the incurrence of such risk.

Another user desiring to eliminate such risk via another user's information management system 191 may consist of central computer system 194 that may be comprised of central processing units, mainframes, super computers, memory, data storage devices, communication systems, system software, communication protocol, application software, devices, related electronics and other computer hardware and software that may be deemed acceptable and may be networked with communication system 195 and adapted computer terminals 192 and 193 by way of a local area network, a wide area network, intranet, the internet and/or other wired and wireless interconnects and network adapters and other modes that may be deemed acceptable, allowing another user, such as another user's adapted computer terminals 192 and 193, to share certain information pertinent to, and necessary, to market, evaluate, analyze, monitor, value, manage and execute the elimination of such risk exposure.

One user desiring to incur risk via one user's information management system 191, by way of adapted computer terminals 192 and/or 193, which may also be comprised of computer processors, storage systems, communication systems, and adapted computer terminals, may share resources, via central computer system 194, which may include processors, memory, data, software, communication protocol, and information, networked by way of local area network, wide area network, intranet, internet and/or wired and wireless interconnects and network adapters and other modes, via communication system 195, which may include a modem or other modes, and may be linked to communication system 157 via communication media link 159 which may be cables, telephone lines, cellular radio, intranet, the internet, satellites and/or other wired and wireless interconnects and network adapters and other communication modes deemed acceptable.

Central computer system 194 may be comprised of central processing units, mainframes, super computers, memory, data storage devices, system software, communication protocol, application software, devices and the related electronics which may be networked with communication system 195 and computers 192 and 193.

Figure 2:
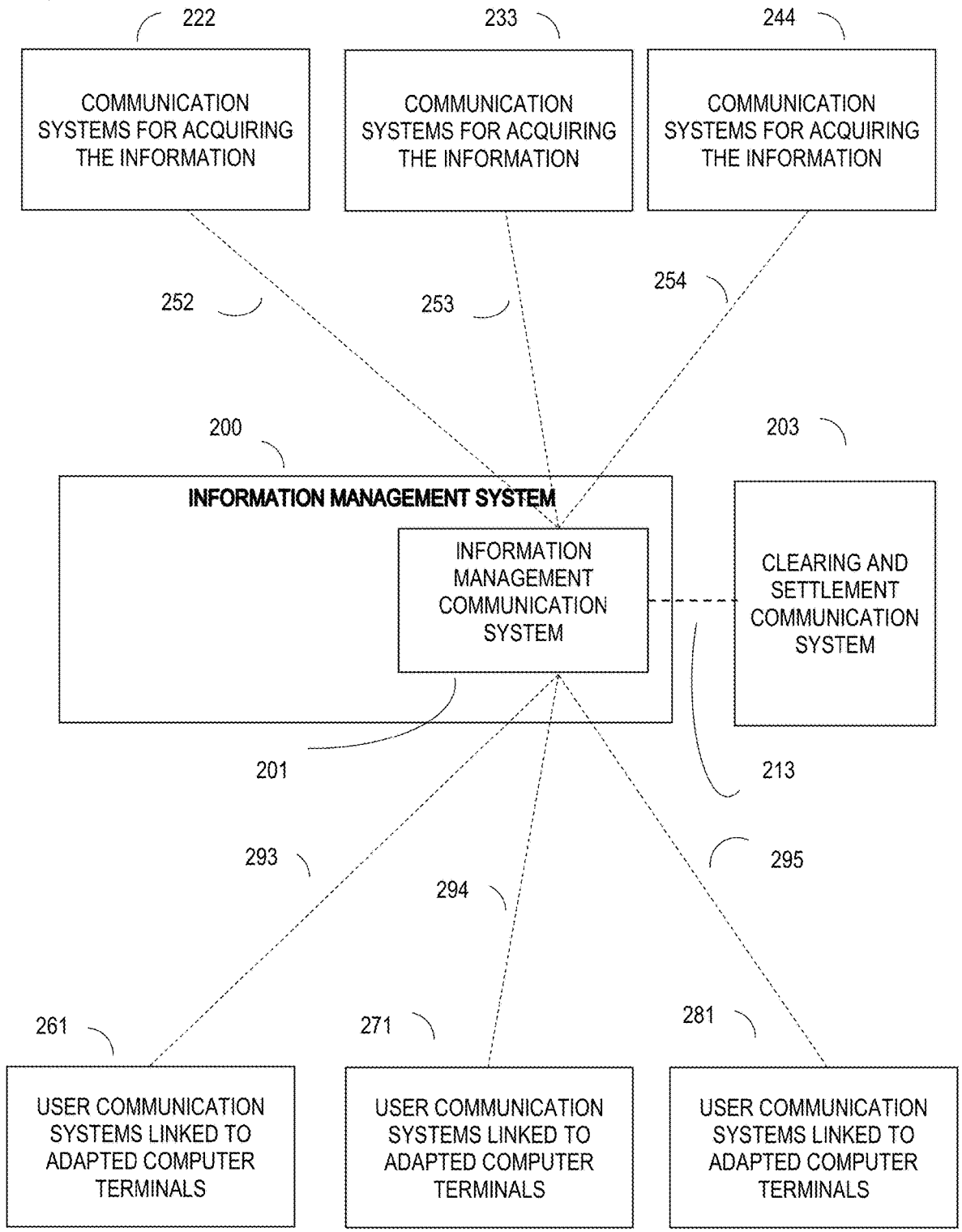
FIG. 2 is a block diagram of communication systems used to implement the processes and functions for the information management system apparatus to acquire data on a real-time, near real-time or most recently available basis and provide access to such information so that users may manage such risk.

Referring to FIG. 2, a block diagram illustrating information management system and information management communication system, such illustration, the depiction of the processes comprising the access or input of information, which includes data, and the presentation or output of such information, a depiction of certain embodiments of the Invention.

Information management system 200, including information management communication system 201, performs processes, comprising information processing cycles of the real-time, near real-time or most recently available data processing, the identification and input of rapidly changing data and the information, and providing the instantaneous or near-instantaneous access to or output of such data and the information in a manner to determine and present such change, in relationship to time, via such system, such data and the information comprising the real-time, near real-time or most recently available information pertinent to the characteristics that are inherent in existing catastrophic events, planet earth's oceans, weather and environment, and the weather and the activity of our solar system; on a continuous or near-continuous basis, providing the means for the instantaneous or near-instantaneous evaluation, monitoring, analysis, valuation and management of the desired risk, such management of the desired risk, the critical means to alter such risk, to increase or incur exposure to such risk or to eliminate or decrease exposure to such risk, due to the continuously or near-continuously changing imminent, unpredictable and uncontrollable characteristics that are inherent in existing catastrophic events, planet Earth's oceans, weather and environment, and the weather and activity of our solar system.

Pursuant to FIG. 2, information management system 200, comprising information processing cycles, real-time data processing or stream processing via information management communication system 201, continuously detects and acquires real-time data, such data, comprising such information, a continuous or near-continuous stream of input information, such information acquired from communication systems for acquiring the information 222, 233 and 244, via wired or wireless communication links 252, 253 and 254, respectively; such information processed by information management system 200, such processing, comprising data stream management or database management, event processing or complex event processing, continuous data protection or continuous backup, the extraction of data and the information retrieval processes of identifying and extracting data and the information from databases based upon queries, and via information management communication system 201, the presentation or output or the enabling of the fetching of the data and the information via adapted computer terminals, via user communication systems linked to adapted computer terminals to acquire information and manage the desired risk 261, 271 and 281, via wired or wireless communication link 293, 294 and 295, respectfully, deriving conclusions from the data and such information, identifying pertinent and crucial events in real-time or near real-time basis and providing the means for user communication system linked to adapted computer terminals 261, 271 and 281, to acquire information and manage the desired risk, via wired or wireless communication link 293, 294 and 295, respectfully, to respond to it in the quickest possible manner, providing the means for the continuous or near-continuous and instantaneous or near-instantaneous evaluation, monitoring, analysis, valuation and management of the desired risk, such management of the desired risk, the means to alter such risk, to increase or incur exposure to the risk or to eliminate or decrease exposure to such risk.

Figure 3:
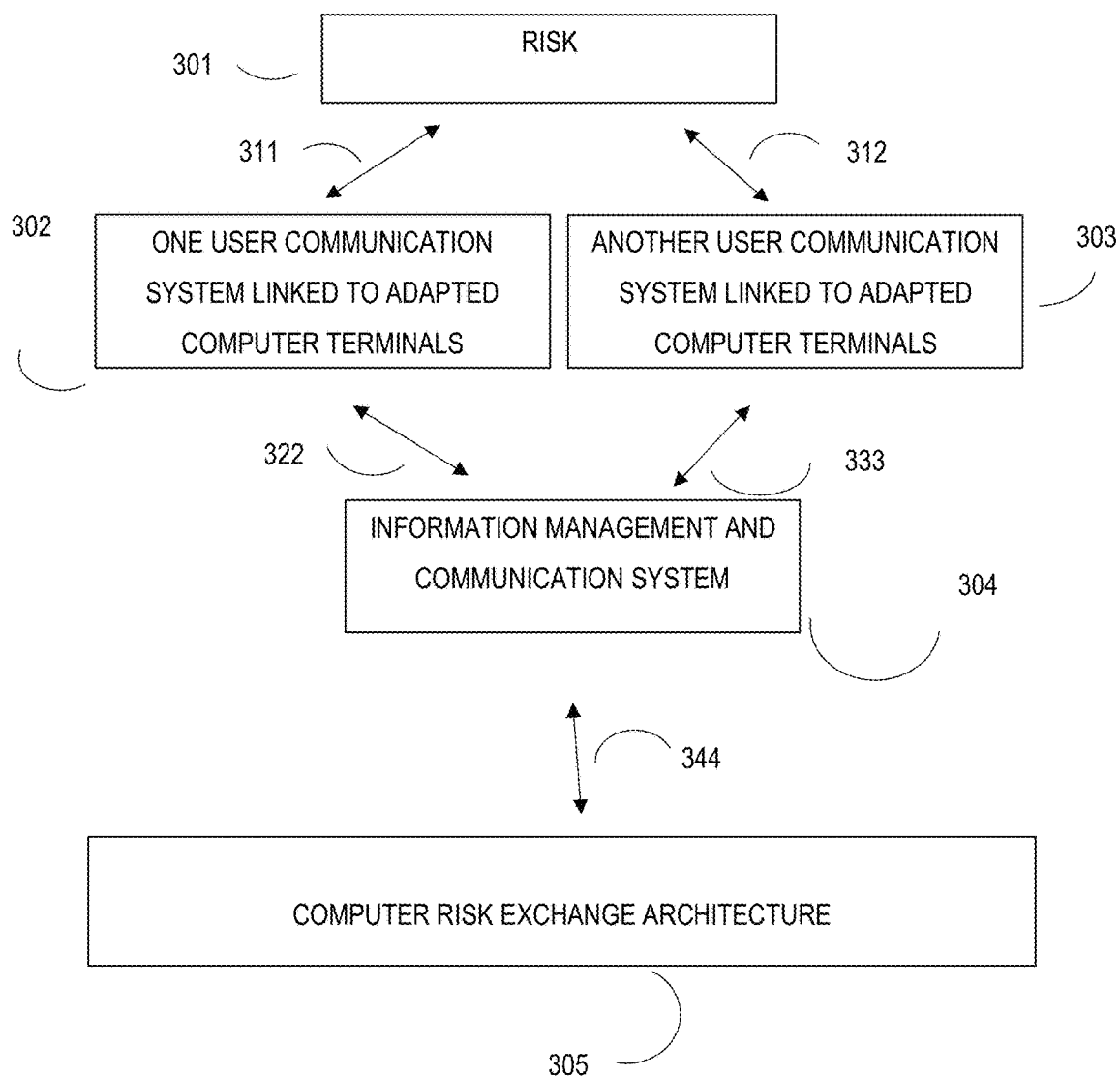
FIG. 3 is a diagram illustrating the management of the risk and one user's desire to eliminate the risk exposure and another user's desire to incur such risk, in accordance with certain embodiments of the Invention.

Referring to FIG. 3, a block diagram illustrating the processes of communication systems in implementing certain embodiments of the Invention. The embodiments of the Invention provide the means for users to manage their desired risk due to the characteristics inherent in existing catastrophic events.

Pursuant to the diagram, via wireless communication link 322, one user via one user adapted computer and communication system 302 accesses the real-time, near real-time or most recently available information and risk valuations and upon analyzing and monitoring such information, one user desires to eliminate risk exposure 311 to risk 301. Accordingly, via one user adapted computer and communication system 302, one user directs such interest, providing such instruction via wireless communication link 322, to information management and communication system 304, such interest is accessed by all users, providing the opportunity for another user, via another user adapted computer and communication system 303 accessing such interest via wired communication link 333, and based upon a different view of such information and such risk 301, another user directs information management and communications system 304 and wired communication link 333 to incur exposure 312 to risk 301, and in a instantaneous or near-instantaneous basis, via wireless communication link 322 and wired communication link 333, the incurrence and elimination of such risk 301 is confirmed between one user and another user and is executed and confirmed by information management and communication system 304, which communicates such incurrence and elimination of risk 301 via wired communication link 344 to computer risk exchange architecture 305 for the clearing and settlement to process one user's elimination of risk exposure 311 to risk 301 and another user's incurrence of such risk exposure 312 to risk 301, and via communication link 344 confirms such process to information management and communication system 304, which further simultaneously provides such confirmation to one user adapted computer and communication system 302 via wireless communication link 322 as well as to another user adapted computer and communication system 303 via wired communication link 333. Risk exposure 311 to risk 301 is eliminated and another user incurs exposure 312 to risk 301.

Figure 4:
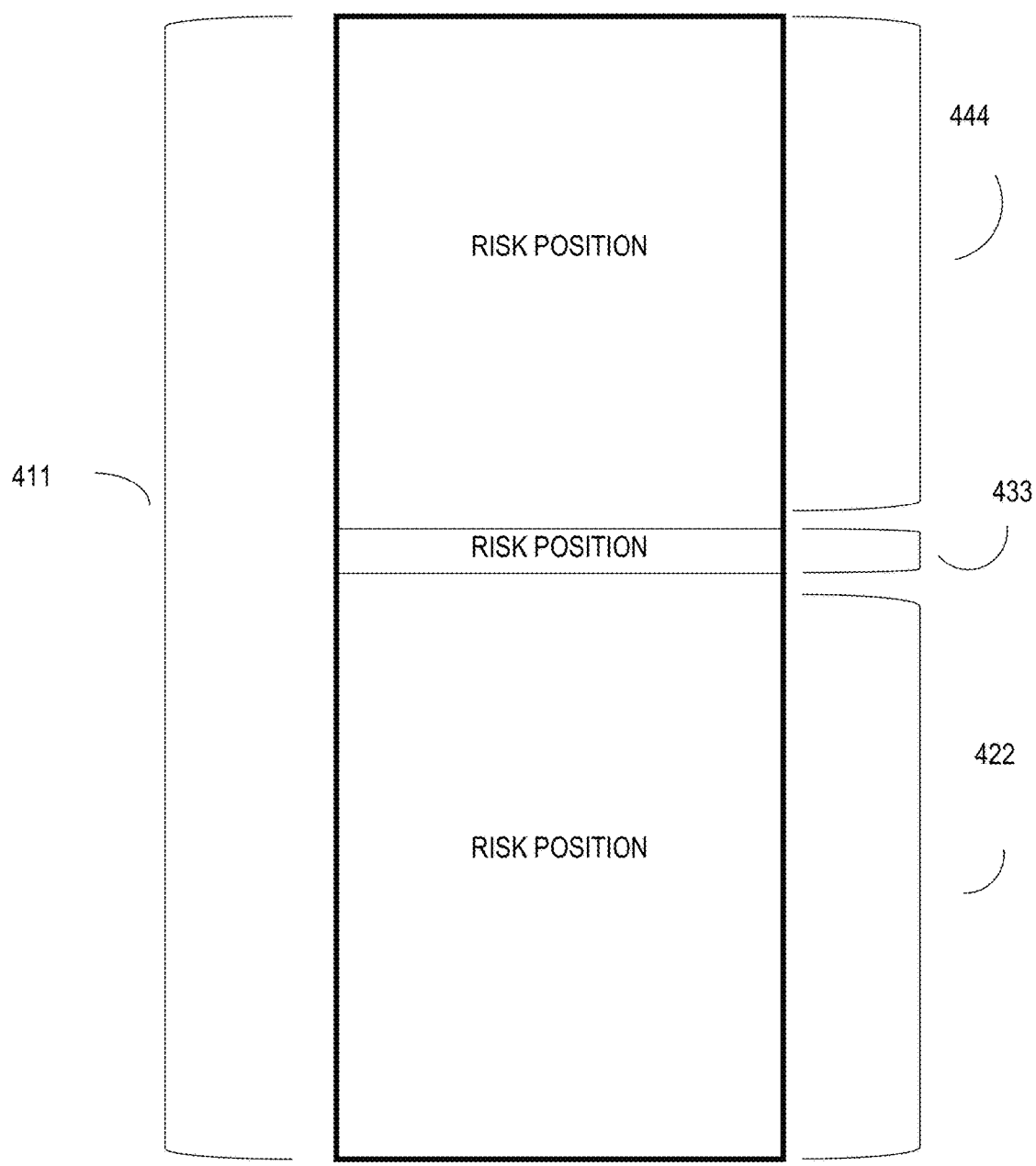
FIG. 4 is a diagram illustrating a risk position that one user undertakes, a USD 100,000,000.00 of risk, should the actual loss exceed USD 5,000,000,000.00, a risk position of USD 5,000,000,000.01 to USD 5,100,000,000.00, in relationship to other risk positions, in accordance with certain embodiments of the Invention.

Referring to FIG. 4, a vertical illustration of identified risk position 411 in which one user desiring to eliminate exposure to the risk, in part, in accordance with certain embodiments of the Invention.

One user desiring to eliminate exposure to the risk illustrated here may be a major City in the United States of America at-risk due to an existing catastrophic event, that such City government user desires to eliminate or reduce exposure to, and another user that desires to incur USD 100 million risk 433, such USD 100 million risk in excess of USD 5 billion, a risk from USD 5,000,000,000.01 to USD 5,100,000,000.00, due to the identified existing catastrophic event. As such, another user grants City government user, the right, but not the obligation, for City government user to eliminate such risk and another user to incur such risk, such right, shall have a five day term from the effective date and an expiration date at the end of the fifth day at 12:00 PM, midnight, New York time, at such a time, such granted right shall expire, if not exercised by the City government user, at a pre-determined monetary amount or exercise payment, such right, granted by another user, to City government user, in exchange for a upfront premium payment by the City government user to another user.

With respect to certain embodiments of the Invention, the characteristics inherent in existing catastrophic events, risk position 411, the identified assets are all assets comprising the city's rail transportation system; the asset class is infrastructure; the specific geographic region is the legal limits of the City, specified by the City, County, State, and Country, and further, another user incurring exposure to such risk, while undertaking USD 100 million risk 433, desires to exclude certain infrastructure, in accordance with certain embodiments of the Invention, notably the River Rail Tunnel located within the legal limits of the geographic location identified, from inclusion in any risk.

In the event that City government user exercises it's right it is determined that a actual of loss that exceeds USD 5,000,000,000.00 had occurred, another user incurring such risk shall be responsible for USD 100 million risk 433, a risk amount of USD 5,000,000,000.01 up to USD 5,100,000, 000.00, but not in excess of risk 433 and not including any loss related to the City's River Rail Tunnel, such USD 100 million payment shall be subject to one or more predetermined settlement dates, payments and a method, the first such payment of one-quarter of such face due 30 days following the determination of such actual loss, such determination of the actual loss shall be determined or ruled upon within 60 days following an actual loss event and three consecutive equal payments, each payment equal to one-quarter of such risk due and payable in 90 day intervals from the previous payment.

Figure 5:
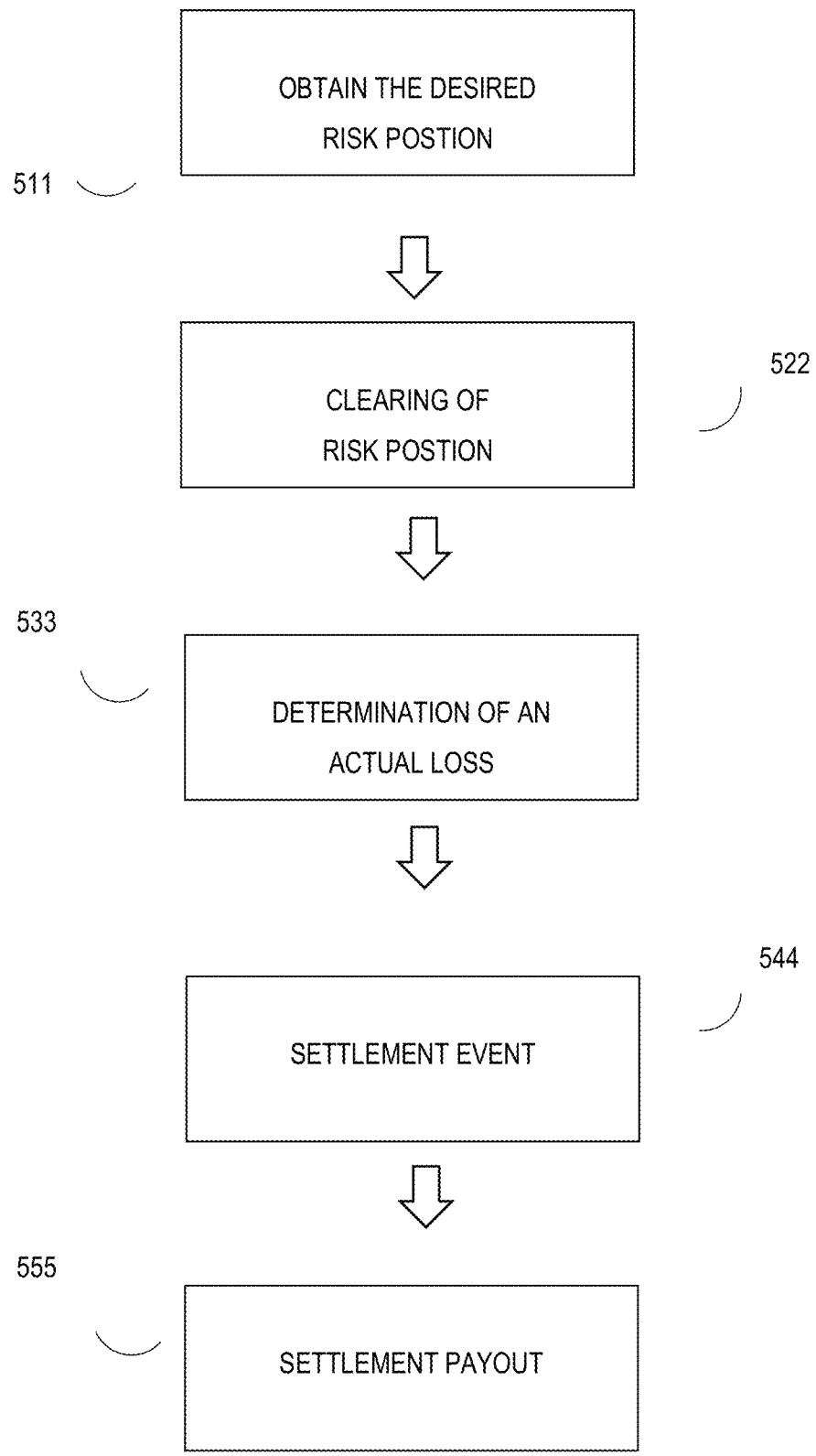
FIG. 5 is a block diagram illustrating the processes and functions of certain embodiments of the Invention, from obtaining a risk position to settlement.

Referring to FIG. 5, a block diagram that comprises the processes and functions of certain embodiments of the Invention.

At step 511, Obtain the desired Risk Position, any authorized users, desiring to incur or eliminate exposure to such risk, in whole or in part, will have access to all the details of such risk due to the characteristics inherent in existing catastrophic events, to make timely, accurate and informed decisions regarding their desire to incur or eliminate exposure to such risk.

At step 522, Clearing of Risk Position, any authorized users may incur or eliminate a desired risk, in whole or in part, via electronic mode or by telephone, a user desiring to incur such risk, or some degree of risk, and a user desiring to eliminate such risk, or some degree of risk, subject to the specific rules pertaining to such use, as agreed to, by users, such rules, comprise pre-approved rules, terms and agreements governing such users, use, including the clearing of the users desired risk positions, as well as any amendments thereto, including the settlement of the agreed upon risk, payments associated with such risk, and any margin and/or margin calls, if any, as required.

At step 533, Determination of an Actual Loss, comprises the determination that an actual loss has occurred, such determination of an actual loss that such user incurring such risk is responsible for, such determination shall be pursuant to specific rules and terms agreed to by such users and include a loss verification determination and opinion, the aforementioned to perform definitive and unbiased research of such risk and opine as to the fact that an actual loss has occurred, before the expiration, termination or maturity date, such actual loss calculated and the users notified of the risk calculation, the determination, ruling and of their responsibility of a settlement payment pursuant to the specific terms agreed to by both users. In the event that it is determined that no settlement event has occurred prior to the termination or maturity date of the transaction, the transaction is terminated.

At step 544, Settlement Payment, should it be determined that an actual loss has occurred, a settlement payment that is due to one user desiring to eliminate or reduce such risk, such settlement payment the responsibility of another user incurring exposure to such risk, such settlement payment to be paid by another user desiring to incur exposure to such risk, and such settlement payment, settlement method, and settlement schedule processed by the clearing operation, including the effect off-setting positions, if any.

Figure 6:
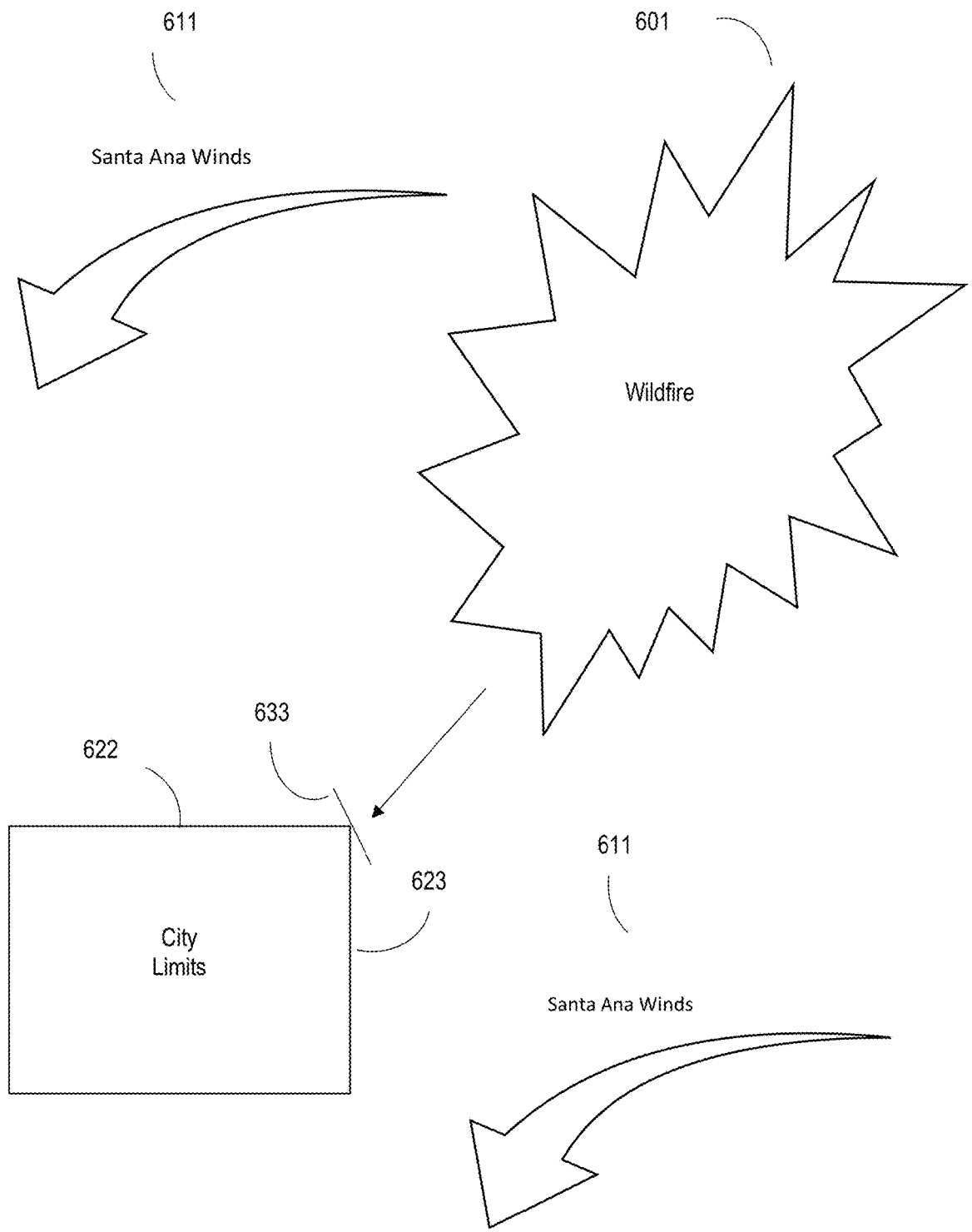
FIG. 6 is a diagram illustrating a predetermined USD 100,000,000.00 risk position in which one user may undertake, such maximum risk that is at-risk to an actual loss, as defined by a set of specific parameters and a specified occurrence, should it be determined that such specific parameters have been breached, a specified occurrence of specific catastrophic event, in accordance with certain embodiments of the Invention.

Referring to FIG. 6, a diagram of a risk position that is predicated on the specific occurrence of a specific catastrophic event.

A City government user, desires to eliminate the risk should the specific catastrophic event, wildfire 601, fueled by the Santa Ana winds 611, present a risk to the City government educational facilities located on the very northeast city limits of such City, by spreading to and breaching the legal city limits of such City. The northern legal city limits of such City is depicted in the top line 622, the eastern legal limits of such City is depicted in right line 623 and the northeast legal city limits of such City 633 is depicted closest to the catastrophic event. The City government, one user, desires to eliminate the risk due to wildfire 601 by a predetermined USD 100 million of risk and another user desires to incur such risk undertaking the predetermined USD 100 million risk, in exchange for earning a risk premium for undertaking such risk. Should it be determined that wildfire 601 breaches the legal city limits of the City, another user, incurring such risk is responsible for the predetermined risk of USD 100,000,000.00, but not in excess of the USD 100,000,000.00 face value.

Figure 7:
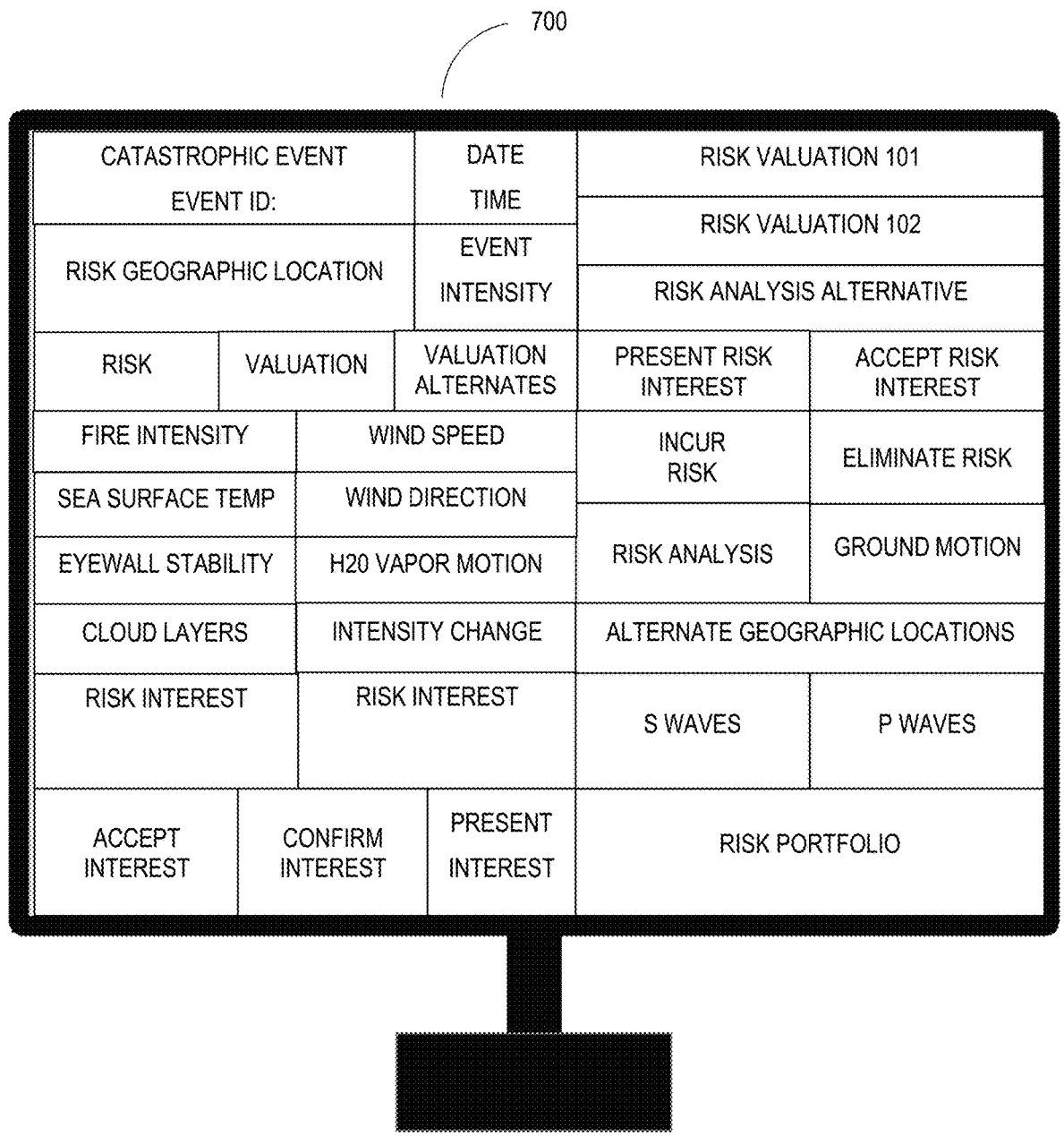
FIG. 7 is a block illustrative depiction of an adapted computer terminal illustrating certain functions for users to manage such risk, in accordance with certain embodiments of the Invention.

Referring to FIG. 7, a block diagram illustrating a depiction of an adapted computer terminal that may be used, by users, in implementing certain embodiments of the Invention.

The adapted computer terminal, by way of a communication system utilizing wired and wireless telecommunications technology, provides the continuous or near-continuous access to, the information, that is pertinent and crucial to the scientific characteristics of existing catastrophic events, planet earth's oceans, weather and environment, and the weather and activity of our solar system, such information that is acquired, processed and presented by the information management system, on a continuous or near-continuous or most recently available basis, to users desiring the ability to instantaneously or near-instantaneously, manage exposure to the risk, based upon such real-time, near real-time or most recently available information, such risk, including the real-time or near real-time valuations and alternative risk valuation, the interest of users desiring to incur exposure or increase exposure to the risk and the interest of users desiring to eliminate exposure or decrease exposure to the risk, and the ability to execute the incurrence and elimination of exposure to such risk, as well as the related clearing and settlement, including such actual loss, shall be presented and accessed by users, using a plurality of adapted computer terminals, networked via the user's central communication and computer systems.

Adapted computer terminal 700 represents a depiction of such adapted computer terminal comprising the functions and components to access such presented data and the information comprising the real-time, near real-time or most recently available information pertinent to the characteristics that are inherent in existing catastrophic events, planet Earth's oceans, weather and environment, and the weather and the activity of our solar system; on a continuous or near-continuous basis, providing the means for the instantaneous or near-instantaneous evaluation, monitoring, analysis, valuation and management of the desired risk, such management of the desired risk, the means to alter such risk, to increase or incur exposure to the risk or to eliminate or decrease exposure to such risk, including the execution of the incurrence and the elimination, of exposure to such risk, due to the continuously or near-continuously changing imminent, unpredictable and uncontrollable characteristics that are inherent in existing catastrophic events, planet Earth's oceans, weather and environment, and the weather and activity of our solar system.

The process of adapting adapted computer terminal 700 comprises either a hardware component or device or a software component that provides for the compatibility of devices to be linked together to transmit and receive such information, the management of exposure to such risk as well as the execution of the incurrence and elimination of such risk, including the clearing of such risk and settlement of an occurrence of an actual loss.

Figure 8:
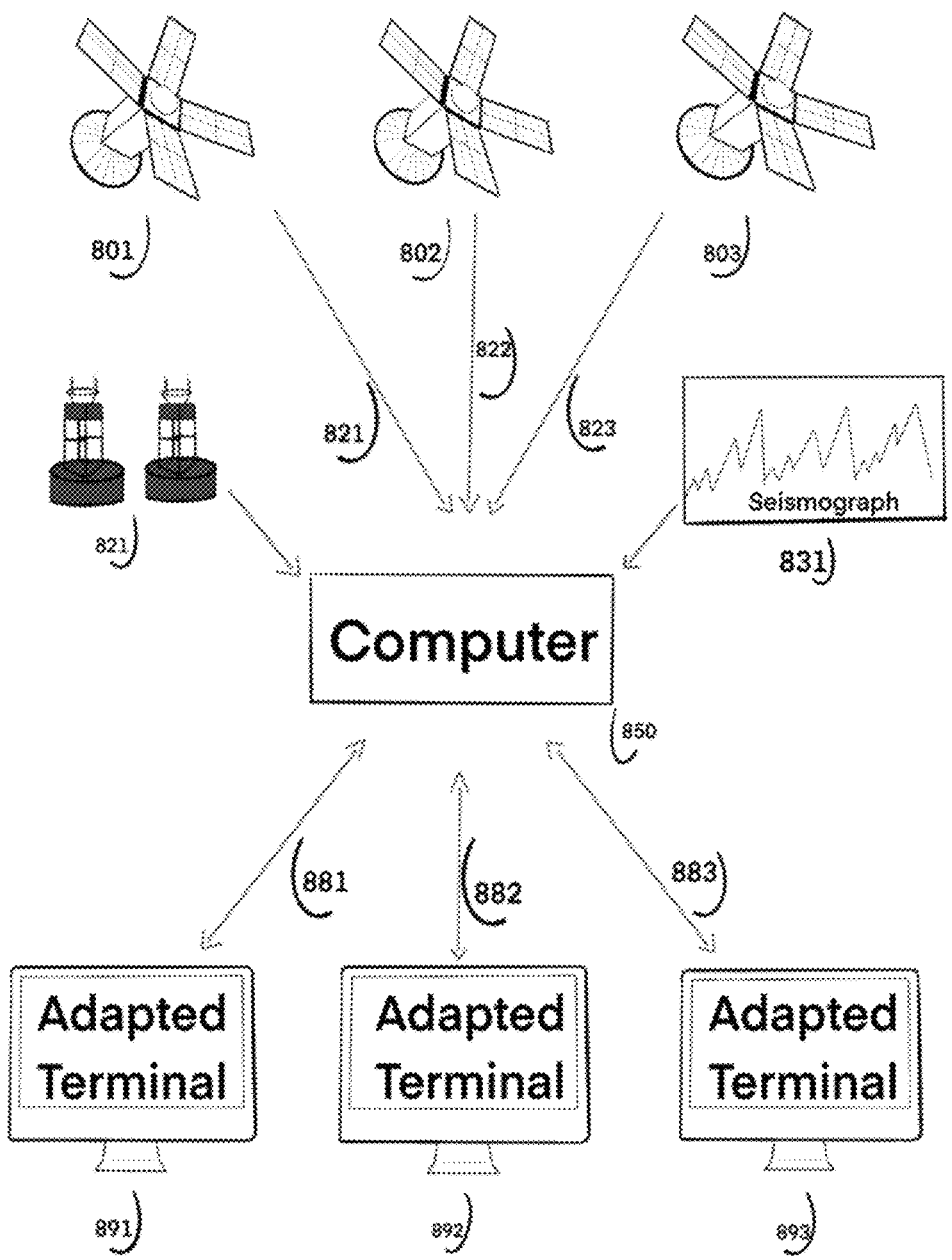
FIG. 8 is a block illustrative depiction of the adapted computer terminals illustrating the access of information, including data, acquired by the computer system, from universe-based satellites, earth terrestrial based sea buoys, and a seismograph, all sources, on a real-time, near real-time, or most recently available basis.

Referring to FIG. 8, a block diagram illustrating a depiction of an adapted computer terminal that may be used, by users, in implementing certain embodiments of the Invention.

The real-time, near real-time, or most recently available data associated with the scientific characteristic inherent in catastrophic events, is derived, directly or indirectly by the information management system-implemented method and apparatus from sources comprising universe-based satellites 801, 802, and 803, positioned in geostationary earth orbit, low earth orbit, medium earth orbit, polar earth orbit, geosynchronous earth orbit, sun-synchronous earth orbit, high elliptical earth orbit, lunar earth orbit, and transfer earth orbit altitudes; such data accessible by communication systems networked to communicate with at least one external device, and earth terrestrial ground station communications links maintaining connections 821, 822, and 823 with satellites 801, 802, and 803 transmitting data at X-band, Ku-band, V-band, W-band, Q-band, C-band, L-band, S-band radio frequencies, or any other band or authorized frequency, or via optical laser communication, or via satellite to satellite links, and; earth terrestrial based sea buoys 821, and seismic monitor 831, configured with communication systems networked to communicate with at least one external device; at least one external device may consist of at least one earth terrestrial-based ground station interconnected through an earth terrestrial-based communication network, wherein an earth terrestrial-based communication network is sinking real-time, near-real-time or most recently available information, including data to computer 850, whereby, computer 850 recognizes adapted computer terminals 891, 892, and 893, via communication links 881, 882, and 883, adapted computer terminals 891, 892, and 893 are configured to access such data, a bi-direction flow of data, in real-time, near real-time, or most recently available information, including data, consisting of the characteristics inherent in existing catastrophic events, planet earth's oceans, weather and environment, and the weather and the activity of our solar system; structured data comprising the risk posed by the characteristics inherent in existing catastrophic events to assets, asset classes, and geographic locations, such risk comprising the geospatial, scientific, structural, and physical interrelationships of the characteristics inherent in existing catastrophic events to those of the assets, asset classes, and geographic locations.

Referring to FIG. 9, is a block diagram that comprises the methods of certain embodiments of the Invention, comprising the analysis and algorithmic process methods detailing the method from deriving the scientific characteristics inherent in catastrophic events on a real-time, near real-time, or most recently available basis to the determination of the risk posed to geographic locations, assets, asset classes, and infrastructure on a real-time, near real-time, or most recently available basis, including the application, implementation, and utilization of machine learning or artificial intelligence.

One of ordinary skill in the art should appreciate that the systems and methods of the Invention, to provide Systems and Methods for Risk Management Utilizing the Scientific Characteristics Inherent in Catastrophic Events, may be practiced in embodiments other than those illustrated herein without departing from the spirit and scope of the Invention.

The invention claimed is:

1. An information management system-implemented method comprising one or more, processors, storage systems, communication systems, and a plurality of adapted computer terminals and devices; such information management system-implemented method comprising:
    deriving information, such information or data comprising the scientific characteristics inherent in existing catastrophic events, planet earth's oceans, weather and environment, and the weather and the activity of our solar system;
    quantifying scientific characteristics inherent in existing catastrophic events, planet earth's oceans, weather and environment, and the weather and the activity of our solar system;
    weighing the scientific characteristics inherent in existing catastrophic events, planet earth's oceans, weather and environment, and the weather and the activity of our solar system;
    prioritizing by order of importance of the scientific characteristics inherent in existing catastrophic events, planet earth's oceans, weather and environment, and the weather and the activity of our solar system;
    calculating and quantifying the intensity of such existing catastrophic events;
    deriving the geospatial, scientific, structural, and physical characteristics of assets, asset classes, infrastructure, and geographic locations;
    calculating and quantifying the risk posed by the intensity of the existing catastrophic event to assets, asset classes, infrastructure, and geographic locations;
    presenting such information to a plurality of computer terminals and devices.

2. The information management system-implemented method in claim 1, wherein upon the derivation of an existing catastrophic event, the quantification, dynamic weighing and prioritization of the scientific characteristics inherent in catastrophic events, the calculation and quantification of the risk of catastrophic events, and the presentation of such information to a plurality of computer terminals and devices comprises the execution of such, on a continuous or near continuous basis.

3. The information management system-implemented method in claim 1, wherein, upon the detection of developing catastrophic events, the derivation, analysis, the quantification, dynamic weighing and prioritization of the scientific characteristics inherent in catastrophic events, and the calculation and quantification of the intensity of the catastrophic events, the calculation and quantification of the risk posed by the intensity of catastrophic events, and the presentation of such information comprises the execution of such, on a real time, near real time, or most recently available basis.

4. The information management system-implemented method in claim 1, wherein the method of calculating and quantifying the risk posed by the scientific characteristics inherent in existing catastrophic events to assets, asset classes, infrastructure, and geographic locations comprises the geospatial, scientific, structural, and physical interrelationships of the scientific characteristics inherent in existing catastrophic events to those of the assets, asset classes, infrastructure, and geographic locations.

5. The information management system-implemented method in claim 1, wherein upon the detection of developing catastrophic events, the derivation, analysis, dynamic weighing and prioritization of the scientific characteristics inherent in catastrophic events, the calculating and quantifying of the intensity of the catastrophic events, and the analysis, calculating and quantifying of the risk posed by the intensity of catastrophic events comprises algorithmically derived values.

6. The information management system-implemented method in claim 1, wherein the prioritization of data, the innate scientific characteristics inherent in catastrophic events, comprises the dynamic weighing and prioritization process consisting of the importance of the scientific characteristics in relation to other scientific characteristics of catastrophic events.

7. The information management system-implemented method in claim 1, wherein the dynamic weighing and prioritization of data comprises the importance of the scientific characteristics to each other, and the risk posed by the catastrophic events to the assets, asset classes, infrastructure, and geographic locations.

8. The information management system-implemented method in claim 1, wherein the determination of the intensity of catastrophic events comprises historical data associated with previous catastrophic events.

9. The information management system-implemented method in claim 1, wherein such information management system-implemented method comprises the application, implementation and utilization of machine learning or artificial intelligence.

10. The information management system-implemented method in claim 1, wherein such information management system-implemented method comprises the utilization and implementation of machine learning or artificial intelligence in the quantification of the risk posed by the catastrophic events to the assets, asset classes, infrastructure, and geographic locations, such risk comprising the geospatial, scientific, structural, and physical interrelationships of the scientific characteristics inherent in existing catastrophic events to those of the assets, asset classes, infrastructure, and geographic locations.

11. The information management system-implemented method in claim 1, wherein the existing catastrophic events comprises cyclonic storms, cyclones, tropical cyclones, typhoons, hurricanes, storm systems, tropical storms, floods, blizzards, hailstorms, ice storms, dust storms, tropical depressions, post-tropical cyclones, nor'easters, windstorms, tornadoes, tsunamis, wildfires, earthquakes, volcanic eruptions, solar storms, and other catastrophic events.

12. The information management system-implemented method in claim 1, wherein such information or data related to the scientific characteristics inherent in catastrophic events comprises the real-time, near real-time or most recently available information pertinent to the characteristics inherent in existing catastrophic events, planet earth's oceans, weather and environment, and the weather and the activity of our solar system, such information, including data, further comprises one or more: sea surface temperatures; sub-surface sea temperatures; the composition of sea water; atmospheric moisture; rates of rainfall; levels of moisture throughout the troposphere; the intensity change to the internal dynamical factors of storm systems; the dynamic instability of the eyewall potential vorticity annulus, it's breakdown and subsequent eddy flux of potential vorticity annulus from the eyewall into the eye; the direction and speed of wind flows; cloud layers; the height of clouds; the cloud top pressures; cloud top temperatures in proximity to storm systems; the depth of clouds; the particles in clouds; the size of particles in clouds; the moisture in clouds; the cloud patterns in proximity to storm systems; the moisture in atmospheric columns; the sea ice concentration in oceans; change in the sea ice covered area of oceans; the motion of water vapor in clouds; the motion of cloud features; lightning flashes; lightning events; the area of lightning groups; the degree of snow cover; the level of radiation in the atmosphere; the level of radiation exiting the atmosphere; hot spots; fires; the size of fires; the height of flames in fires; the intensity of fires; the type and condition of the fuel complex of fires; the heat released from surface fuels; the behavior of fires; fuel moisture content; the mass of canopy fuel; fuel continuity of the ecosystem of fires; the rate of which the fire is spreading; the degree of control of fires; the degree of containment of fires; the biomass of the ecosystem of fires; wind speeds; the height of volcanic ash; the mass of volcanic ash; radiances; ocean wave height; the degree of change in ocean wave height; algal blooms; the degree of cloudiness in the sky; sea level pressures; surface wind speeds; seismic activity; the movement of tectonic plates; the movement of magma; the change in the degree of the movement of magma; the dispensing of volcanic gas; the change in the degree of volcanic gas dispensed; the procession of earthquakes; the magnitude of earthquakes; the degree of change in the magnitude of earthquakes; tremors; surface changes on a volcano; the development of lava lakes on a volcano; surface changes in the immediate surrounding area of a volcano; the increase in the degree of rumbling of a volcano; magma raising from a volcano; the viscosity of magma rising from a volcano; the degree of silica in the magma rising from a volcano; the degree of pressurized gases released from the fumaroles of a volcano; the degree of the temperature of the gases released from a volcano; the radiation of compressional (P) waves and transverse (S) waves outward from the epicenter of an earthquake; the probability of exceeding levels of historical ground shaking; the probability, magnitudes and locations of earthquakes; ground motion detections from seismic stations; the eruption of gas and particles from the Sun's corona; solar wind; changes in solar wind; radiation emitted from the Sun into space; the degree of radiation emitted into space; the degree of the electrical charge of particles from the Sun's corona; solar wind blasts; the degree of solar wind blasts; auroras from charged particles emitted from the Sun; the degree of the auroras; solar flares from solar storms; solar eruptions or coronal mass ejections, and; the effect of the weather and activity of our solar system on the atmosphere.

13. The information management system-implemented method in claim 1, wherein the real-time, near real-time, or most recently available information, including data, associated with the scientific characteristic inherent in catastrophic events, is derived, directly or indirectly by the information management system-implemented method from sources comprising universe-based satellites, and earth terrestrial-based monitoring devices, such networked observation satellites positioned in geostationary earth orbit, low earth orbit, medium earth orbit, polar earth orbit, geosynchronous earth orbit, sun-synchronous earth orbit, high elliptical earth orbit, lunar earth orbit, and transfer earth orbit altitudes; such data accessible by communication systems networked to communicate with at least one external device, and earth terrestrial ground station communications links maintaining connections with the satellites transmitting data at X-band, Ku-band, V-band, W-band, Q-band, C-band, L-band, S-band radio frequencies, or any other band or authorized frequency, or via optical laser communication, or via satellite to satellite links, a plurality of networked earth terrestrial based seismic monitors, aircraft, drones, balloons, and sea buoys, configured with communication systems networked to communicate with at least one external device, at least one external device that may consist of at least one earth terrestrial-based ground station interconnected through an earth terrestrial-based communication network, wherein an earth terrestrial-based communication network is sinking real-time, near-real-time or most recently available data to the information management system.

14. The information management system-implemented method in claim 1, wherein the real-time, near real-time, or most recently available information or data, associated with the scientific characteristic inherent in catastrophic events, is derived, directly or indirectly by the information management system-implemented method from sources comprises the physical on-site gathering and scientific experimentation and research of the scientific characteristics inherent in catastrophic events.

15. The information management system-implemented method in claim 1, wherein the risk of existing catastrophic events comprises a specified geographic location with the legally defined boundaries such as a Country, a Territory, a Republic, a State, a District, a County, a Parish, a City, a Township, a Municipality, a zip code, or a specific address.

16. The information management system-implemented method in claim 15, wherein the risk of existing catastrophic events comprises a specified geographic location with legally defined boundaries or any precisely defined area or a particular extent of surface or space on the planet earth.

17. The information management system-implemented method in claim 1, wherein the risk associated with catastrophic events, comprising the scientific characteristics inherent in catastrophic event and their interrelationship to geospatial, scientific, structural, and physical characteristics associated with one or more asset classes, further comprises commercial real estate, residential real estate, infrastructure, and personal property.

18. The information management system-implemented method in claim 1, wherein the risk associated with catastrophic events comprising the scientific characteristics inherent in catastrophic events and their interrelationships to geospatial, scientific, structural, and physical characteristics associated with one or more assets, asset classes, infrastructure, and geographic locations, comprises the analysis, calculation and quantification of an implied risk value (IRV) to one or more assets, asset classes, infrastructure, or a specific geographic location, such IRV expressed as in an acceptable currency.

19. A system for the information management implemented method comprising:
- one or more processors, storage systems, communication systems, and a plurality of adapted computer terminals and devices;
- an enterprise management architecture (EMA) comprising electronic system configurations and functions to execute the derivation of information, such information or data comprising the innate scientific characteristics inherent in existing catastrophic events, planet earth's oceans, weather and environment, and the weather and activity of our solar system;
- the EMA comprising the electronic system configurations and functions to quantify the scientific characteristics inherent in existing catastrophic events, planet earth's oceans, weather and environment, and the weather and activity of our solar system;
- the EMA comprising a configuration to dynamically weigh and prioritize the scientific characteristics inherent in existing catastrophic events, planet earth's oceans, weather and environment, and the weather and the activity of our solar system;
- the EMA comprising the electronic system configurations and functions to dynamically weigh and prioritize by order of importance of the scientific characteristics inherent in existing catastrophic events, planet earth's oceans, weather and environment, and the weather and the activity of our solar system, by order of importance to each other and the intensity of such catastrophic event;
- the EMA comprising the electronic system configurations and functions to calculate and determine the intensity of such existing catastrophic events;
- the EMA comprising the electronic system configurations and functions to derive the geospatial, scientific, structural, and physical characteristics of assets, asset classes, infrastructure, and geographic locations;
- the EMA comprising the electronic system configurations and functions to calculate and determine the risk posed by the intensity of the existing catastrophic events to assets, asset classes, infrastructure, and geographic locations;
- the EMA comprising the electronic system configurations and functions to present such information to a plurality of computer terminals and devices;
- the EMA comprising the electronic system configurations and functions to, upon the detection of developing catastrophic events, the deriving, analyzing, quantifying, dynamically weighing, and prioritizing the scientific characteristics inherent in catastrophic events, and the determination of the intensity of catastrophic events, the analysis of the risk posed by the intensity of catastrophic events, and the presentation of such information comprises the execution on a real time, near real time, or most recently available basis;
- the EMA comprising the electronic system configurations and functions to ascertain the risk posed by the scientific characteristics inherent in existing catastrophic events to assets, asset classes, infrastructure, and geographic locations comprises the geospatial, scientific, structural, and physical interrelationships of the scientific characteristics inherent in existing catastrophic events to those of the assets, asset classes, infrastructure, and geographic locations;
- the EMA comprising the electronic system configurations and functions to algorithmically derive values for developing catastrophic events, the derivation, analysis, quantification, weighing the prioritization of the scientific characteristics inherent in catastrophic events, and the determination of the intensity of the catastrophic events, the analysis of the risk posed by the intensity of catastrophic events, and the presentation of such information; and
- the EMA comprising the electronic system configurations and functions to implement and utilize machine learning or artificial intelligence in the methods and processes.

20. The system for the information management implemented method in claim 19, wherein the EMA comprises the electronic system configurations and functions to communicate with a plurality of adapted computer terminals and, such adapted computer terminals and devices adapted to be linked to, recognized by, and verified by the EMA via one or more system processors, storage systems, and one or more communication systems, a bi-directional flow of data, such bi-directional flow of data associated with a specific account, and the implementation of limitations associated with such specific account; to access and display the information that includes data on a real-time, near real-time, or most recently available basis; such information comprising the characteristics inherent in existing catastrophic events, planet earth's oceans, weather and environment, and the weather and the activity of our solar system; wherein such information is necessary to ascertain the risk posed by existing catastrophic events to assets, asset classes, infrastructure, and geographic locations, such risk comprising the geospatial, scientific, structural, and physical interrelationships of the characteristics inherent in existing catastrophic events to those of the assets, asset classes, infrastructure, and geographic locations.

21. The system for the information management implemented method in claim 19, wherein the EMA comprises the electronic system configurations and functions for the electronic implementation of the exchange of the risk associated with such information, that includes data, accessible on a real-time, near real-time, or most recently available basis; such information consisting of the scientific characteristics inherent in existing catastrophic events, planet earth's oceans, weather and environment, and the weather and the activity of our solar system; wherein such information is necessary to ascertain the risk posed by the scientific characteristics inherent in existing catastrophic events to assets, asset classes, infrastructure, and geographic locations, such risk comprising the geospatial, scientific, structural, and physical interrelationships of the characteristics inherent in existing catastrophic events to those of the assets, asset classes, infrastructure, and geographic locations, and accessible via a plurality of adapted computer terminals and devices.

22. The system for the information management implemented method in claim 19, wherein the EMA, via one or more processors, storage and communication systems, comprises the electronic system configurations and functions for the electronic system functions to access, analyze, create, present, and store structured data further derived from the real-time, near real-time, or most recently available basis;

such information consisting of the scientific characteristics inherent in existing catastrophic events, planet earth's oceans, weather and environment, and the weather and the activity of our solar system; historical information, and; structured data comprising the risk posed by the characteristics inherent in existing catastrophic events to assets, asset classes, infrastructure, and geographic locations, such risk comprising the geospatial, scientific, structural, and physical interrelationships of the characteristics inherent in existing catastrophic events to those of the assets, asset classes, infrastructure, and geographic locations; structured data comprised of an algorithmically derived values; structured data comprised from the implementation of artificial intelligence, machine learning, and; present such information to a plurality of adapted computer terminals and devices.

23. The system for the information management implemented method in claim 19, wherein the EMA, via one or more processors, storage, and communication systems, comprises the electronic system configurations and functions wherein one or more adapted computer terminals and devices comprises the adapted control function for the recognition of such adapted computer terminals and devices.

24. The system for the information management implemented method in claim 19, wherein the EMA, via one or more processors, storage and communication systems, comprises the electronic system configurations and functions where one or more adapted computer terminals and devices, in communication with EMA, comprises the electronic system configurations and functions to access the real-time, near real-time, or most recently available basis, such information consisting of the scientific characteristics inherent in existing catastrophic events, planet earth's oceans, weather and environment, and the weather and the activity of our solar system, to detect, weigh, grade, prioritize, process and store structured data comprising the risk posed by the characteristics inherent in existing catastrophic events to assets, asset classes, and geographic locations, such risk comprising the geospatial, scientific, structural, and physical interrelationships of the characteristics inherent in existing catastrophic events to those of the assets, asset classes, infrastructure, and geographic locations.

25. The system for the information management implemented method in claim 19, wherein the EMA, via one or more processors, storage and communication systems, where one or more adapted computer terminals and devices, comprises the electronic system configurations and functions for the input instructions or commands, a bi-directional flow of data, such instructions or commands to access various elements of the information, including data, related to the characteristics inherent in catastrophic events; historical changes and rates of change to certain specific characteristics inherent in catastrophic events, and; certain projections or presumptions as to changes or rates of change to certain specific characteristics inherent in catastrophic events.

26. The system for the information management implemented method in claim 19, wherein the EMA, via one or more processors, storage and communication systems, comprises the electronic system configurations and functions to provide access to a plurality of adapted computer terminals and devices, via the communication systems, a bi-directional flow of data, such configurations and functions to provide market data, monitoring, and analysis for the exchange of the specific risk associated with catastrophic events; such access, to the outstanding indications of interest; executed risk management orders, as they relate to specific existing catastrophic event; assets; asset classes; infrastructure; geographical locations; the degree of risk a user wishes to access; the interrelationships of the scientific characteristics inherent in the existing catastrophic events and the assets, asset classes, infrastructure, and geographic locations, including their geospatial, scientific, physical, and structural interrelationships with catastrophic events, the current value of such risk; the current price of contracts; the pricing levels of contracts, and; the maturities of contracts, such risk instructions or commands, that are received directly from user accounts.

27. The system for the information management implemented method in claim 19, wherein the EMA, comprises the configurations and functions to provide access to, a plurality of adapted computer terminals, via the communication systems, a bi-directional flow of data, such configurations and functions to conduct the electronic exchange of the specific risk associated with catastrophic events, such access to input instructions or commands, to execute risk management orders, as they relate to specific existing catastrophic events; assets; asset classes, infrastructure, and geographical locations, the interrelationships of the scientific characteristics inherent in the existing catastrophic events and the assets, asset classes, infrastructure, and geographic locations, including their geospatial, scientific, physical, and structural interrelationships, such risk management orders that are received directly from accounts.

28. The system for the information management implemented method in claim 19, wherein the EMA, comprises the configurations and functions to provide access to, a plurality of adapted computer terminals, via the communication systems, a bi-directional flow of data, such configurations and functions to conduct the electronic exchange of the specific risk associated with catastrophic events, such access to input instructions or commands; providing user risk portfolio monitoring, analysis, and the execution of risk management orders, the current value of such executed risk; the current price of contracts of such executed risk; the maturities of contracts for executed risk; the quantitative analysis programs designed for the analysis of existing, prospective, and alternative risk positions; quantitative analysis program to analyze the potential change in the scientific characteristics inherent in catastrophic events and the related potential change to the price of the risk contracts; programs providing the user's the ability to incorporate, link, and utilize the user's proprietary software for the analysis of existing, prospective, and alternative risk positions in relation to the risk management of such risk; maps, simulations, and video, and; all such technological capabilities providing the users the ability to manage such risk in an instantaneous or near instantaneous, or timely manner.

29. The system for the information management implemented method in claim 19, wherein the EMA comprises the configurations and functions to derive, calculate and determine an explicit risk value (ERV) posed by the existing catastrophic events to assets, asset classes, infrastructure, and geographic locations, such ERV expressed as a percentage, any degree of risk value, or a value in an acceptable currency.

30. The system for the information management implemented method in claim 19, wherein the EMA, comprises the configurations and functions providing access to, a plurality of adapted computer terminals and devices, via the communication systems, a bi-directional flow of data, such configurations and functions, comprising the conduction of the electronic exchange of the specific risk associated with specific catastrophic events, such risk that relates to specific existing catastrophic events, assets, asset classes, infrastructure, and geographical locations, such risk comprising the interrelationships of the scientific characteristics inherent in the existing catastrophic events and the assets, asset classes, infrastructure, and geographic locations, including their geospatial, scientific, physical, and structural interrelationships.

31. The system for the information management implemented method in claim 19, wherein the EMA, comprises the configurations and functions to implement a net maximum catastrophic risk allocation value (MCRAV) component, comprising the net long and/or the net short positions, such MCRAV associated with accounts that are associated with certain adapted computer terminals and devices, for a specific catastrophic event, and the electronic exchange of the specific risk associated with specific catastrophic events, such risk that relates to specific existing catastrophic events, assets, asset classes, infrastructure, and geographical locations, such risk comprising the interrelationships of the scientific characteristics inherent in the existing catastrophic events and the assets, asset classes, infrastructure, and geographic locations, comprising the geospatial, scientific, physical, and structural interrelationships, to monitor and manage the MCRA in the electronic exchange of the specific risk associated with specific catastrophic events to prevent the exceedance of the net risk limit or MCRA associated with a particular account, causing a lockdown.

32. The system for the information management implemented method in claim 19, wherein the EMA, comprises the configurations and functions to implement a matching component for the electronic exchange of the specific risk associated with specific catastrophic events, such risk that relates to specific existing catastrophic events, assets, asset classes, infrastructure, and geographical locations, such risk comprising the interrelationships of the scientific characteristics inherent in the existing catastrophic events and the assets, asset classes, infrastructure, and geographic locations, comprising the geospatial, scientific, physical, and structural interrelationships, wherein the matching component matches the electronic order request of accounts for the electronic exchange of specific risk associated with a specific catastrophic event, and MCRA.

* * * * *